United States Patent [19]

Ogrisek et al.

[11] 4,129,379

[45] Dec. 12, 1978

[54] OPTICAL SYSTEM FOR ELECTROSTATIC COPIERS

[76] Inventors: Harriet H. Ogrisek, Bonndorferstr. 7, 7827 Loffingen, Fed. Rep. of Germany; Kurt Egger, Bahnhofstr. 13-15, 7470 Albstadt-Tailfingen, Fed. Rep. of Germany

[21] Appl. No.: 851,967

[22] Filed: Nov. 16, 1977

[30] Foreign Application Priority Data

Nov. 17, 1976 [DE] Fed. Rep. of Germany ... 7636234[U]

[51] Int. Cl.[2] ...................... G03B 27/34; G03B 27/40; G03B 27/70

[52] U.S. Cl. .......................................... 355/57; 355/8; 355/49; 355/60

[58] Field of Search ................... 355/8, 11, 51, 57, 60, 355/65, 66, 49

[56] References Cited

U.S. PATENT DOCUMENTS

| | | | |
|---|---|---|---|
| 3,377,913 | 4/1968 | Grant, Jr. ......................... | 355/49 X |
| 3,408,141 | 10/1968 | Grant, Jr. ......................... | 355/60 X |
| 3,661,455 | 5/1972 | Namiki et al. ..................... | 355/49 X |

*Primary Examiner*—Richard A. Wintercorn
*Attorney, Agent, or Firm*—Blair, Brown & Kreten

[57] ABSTRACT

An optical system for use within a copying machine of the type in which sequential line portions of the original document are illuminated and the light therefrom is reflected by a primary mirror onto an objective element which, in turn, forms a focussed image on a copying drum which rotates in synchronism with the motion of the illumination. In order to provide copying capability at another ratio of reproduction, the primary mirror is made pivotable. In its second position, it reflects the light from the illuminated line portion onto a first supplemental mirror which reflects it onto a second supplemental mirror that directs it to a second objective element. The second objective element forms a focussed image on the copying drum, that image being of different size but located at the same edge of the copying drum as the image from the first objective element.

11 Claims, 3 Drawing Figures

OPTICAL SYSTEM FOR ELECTROSTATIC COPIERS

BACKGROUND OF THE INVENTION

The invention relates to electrostatic copiers. More particularly, the invention relates to the optical system for electrostatic copiers which include a copying drum that has a lateral guide mechanism for the paper and which includes a primary deviating mirror which reflects the light from the line region of an original which is traversed along the length of the paper. The image of the illuminated part of the original is focused by suitable optical means on the copying drum which rotates synchronously with the motion of the illuminated part of the original.

In known electrostatic copiers of the above described type, the original page is placed on a glass plate and is illuminated line by line. The optical system which consists substantially of the deviating mirror and the objective lens or mirror focuses the image of the temporarily illuminated line portion of the original onto the electrostatically charged copying drum. Subsequently the paper on which the copy is to be made is brought into juxtaposition to the copying drum and is guided along the edge of the drum by a suitable margin guide, for example a guide ribbon. In order to permit copying the entirety of the original onto the copying drum, the latter is rotated synchronously with the motion of the illuminating mechanism of the original and at the same linear speed. The traveling illumination of the line portions of the original may be performed either by having a fixed lamp over which the original document is passed or by placing the lamp on a movable sled which is moved over the original document. In the latter case it is required to include a movable mirror system in order to keep the optical path from the object to the copying drum constant so as to maintain the required focusing.

It is a disadvantage of these known copying machines that they are basically suitable only for copying with a fixed reproduction format. Normally the optical system is so designed as to produce, for example, an image in the ratio of one-to-one whose lateral edge coincides with the paper guide of the copying drum. If the optical system is altered, for example by displacing the objective lens or mirror so as to obtain a reduced image, the reduced image of the original will normally be located in the central region of copying drum and will no longer be contiguous to the lateral paper guide. In order to place the image at the edge, i.e. the lateral guide of the copying drum, the guide mechanism would have to be displaced on the drum which would entail substantial technical difficulties.

When known copying machines were heretofore used with the provision of variable reproduction format, it has therefore been required to use very expensive exchangeable optical systems or else to make available a different copier for each desired reproduction format.

OBJECT AND SUMMARY OF THE INVENTION

It is thus a principal object of the invention to provide an electrostatic copier which includes an optical system that is free from the above described disadvantages. It is a particular object of the present invention to provide an optical system for an electrostatic copier in which the image will be placed at the lateral edge of the copying paper irrespective of the reproduction ratio.

It is another object of the invention to provide an optical system of this type which is simple in construction and therefore economical to produce.

Yet another object of the invention is to provide an optical system in which the changeover from one reproduction format to another may be made in a simple manner and without substantial modifications of the optical system or exchanges thereof.

These and other objects are attained in an optical system of an electrostatic copier by providing a second objective lens or mirror which is displaced both laterally and vertically with respect to the primary objective. The invention further provides two supplementary deviating mirrors which are plane parallel with respect to one another and are located respectively above and below the optical path between the primary deviating mirror and the primary objective. Furthermore the axis of the additional deviating mirrors is oblique with respect to the principal optical axis and the plane of the additional mirrors is inclined with respect to the plane which is normal to the optical path.

Yet another feature of the invention is that the principal deviating mirror may be pivoted in one of at least two positions, in the second of which the light coming from the original document to be copied is reflected to one of the additional mirrors, the position and angle of the two supplementary mirrors being such that the light is then passed to the second supplementary deviating mirror and hence to the secondary objective lens or mirror. The secondary objective then focuses the image onto the copying drum along an optical axis which is substantially parallel to that of the principal objective.

The novel optical system according to the present invention is thus a modification of a known optical system which includes a principal deviating mirror which reflects the light from the original document, i.e. from the object, to the principal objective lens or mirror which focuses an image on the copying drum in a predetermined ratio, for example in the ratio one-to-one. The basic function of this known optical system is not substantially altered in the novel system according to the present invention, provided that the principal deviating mirror remains in its first position which corresponds to that normally occupied in a known system.

The invention provides, however, for the principal deviating mirror to be placed in a second position in which it no longer reflects the light from the object onto the first and principal objective but rather reflects it onto the first and, in the preferred embodiment, upper of two supplementary deviating mirrors. The first supplementary mirror reflects the light onto the second and, in the preferred embodiment, lower supplementary deviating mirror which in turn reflects the light onto the second objective lens or mirror which focuses an image on the copying drum. The additional double deviation of the optical beam by means of the supplementary deviating mirrors results in an extension of the optical path from the object to the objective lens or mirror with the result that the image formed by the second objective will be reduced by comparison with the image formed by the first objective. The oblique position of the axes of the two supplementary deviating mirrors insures that the optical axis of the beam reflected by the second objective onto the copying drum will be displaced laterally with respect to the optical axis of the rays from the first objective. Therefore the edge of the reduced image will be exactly located at the lateral paper guide line of the copier drum as was the image at the original copying ratio.

By causing the principal deviating mirror to occupy two discrete positions, it is therefore possible, in the optical system according to the present invention, to make copies in two different reproduction ratios, for example in an original ratio of 1 : 1 and in a reduced ratio of 2 : 1.

The switchover from one to the other of the reproduction ratios requires only a simple pivoting of the principal deviating mirror. This pivoting action may be controlled in a simple manner by a switch located at the outside of the apparatus thus permitting very convenient selection of the copying ratio by the operator. As has been pointed out above, the optical system according to the present invention requires only two additional mirrors and one additional objective lens or mirror so that the additional costs of manufacture by comparison with known systems are very small. Furthermore, the optical system according to the present invention is extremely compact and fits in substantially the same space as the known optical system which permits copying only at a single reproduction ratio.

It is another advantageous feature of the novel optical system according to the present invention that the speed of illumination of the portions of the original document remains entirely unchanged so that the copying speed of the apparatus is maintained even when the reproduction ratio is switched.

The magnitude of the angle by which the mirrors are placed obliquely with respect to the optical axis as well as the reflecting angles of the additional deviating mirrors and their distance from each other as well as from the second objective lens or mirror are chosen in accordance with the desired degree of reduction and also in accordance with the optical characteristics of the second objective element. The magnitude of the reduction obtained is determined by the focal length of the second objective, as well as by the ratio of the optical path ahead of the second objective, as extended by the additional mirrors, to the optical path from the second objective to the image. Based on this predetermined desired amount of reduction, the obliquity angle of the additional mirrors is now selected so as to place the lateral edge of the reduced image exactly at the edge guide line of the copying drum. By making the planes of the two supplementary deviating mirrors exactly parallel to one another, any distortion of the image is completely prevented in spite of the additional deviation of the beam.

The manufacture of the optical system according to the invention is simplified by constructing the two objective elements as identical lenses.

In order to obtain a focused and reduced image of the original on the copying drum, the second objective must be displaced along its optical axis with respect to the first objective element.

In a further advantageous feature of the invention, the two objectives as well as the primary deviating mirror and the two supplementary deviating mirrors are installed in a frame which can be placed within the copying machine. In this manner the entire optical system may be calibrated and adjusted in advance as a single unit and can be thus installed into the copier. Furthermore this modular construction permits replacing a known optical system in a particular copying machine by a system according to the invention permitting two selectable copying formats.

The pivoting of the primary deviating mirror to obtain the selection of a copying format is advantageously performed by an electromagnet also installed as part of the optical system.

The objective elements in the present invention may preferably be lenses mirrored on one side. In that case the lower supplementary deviating mirror will be located below the beam reflected by the second objective element onto the drum so as not to interfere with the image formation by the second objective.

It will be understood that the objective elements may also be transparent elements, i.e. lenses. However the use of mirrored lenses results in a more compact construction of the overall objective system.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
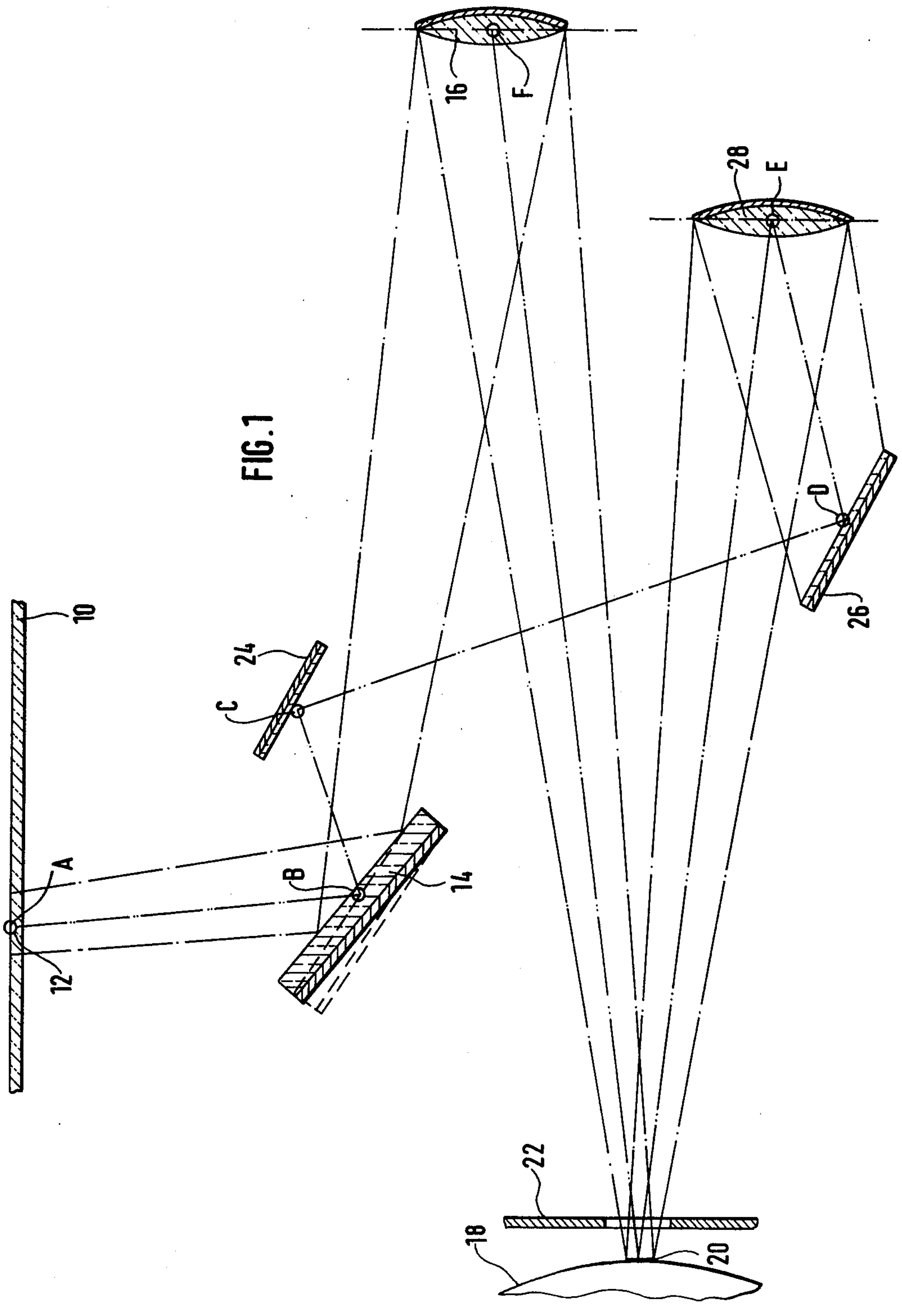
FIG. 1 is a schematic side view of the optical system according to the invention.

Turning now to FIG. 1, there will be seen a document holder 10, for example a glass plate on which the document or object to be copied is placed. During the copying operation, the document holder 10 together with the document placed thereon is moved over a fixed lamp unit by a mechanism not shown. During that motion there occurs consecutive illumination of line regions 12 of the original document and the relative location of these regions 12 with respect to the optical system shown remains fixed.

Located below the document holder 10 is a primary deviating mirror 14. The longitudinal axis of the mirror 14 is horizontal and is parallel to the extent of the illuminated line portion 12. The plane of the mirror 14 is seen to be disposed inclined with respect to the plane of the document holder 10. In the position shown in solid lines, the primary deviating mirror 14 occupies a first position while a second position which the mirror 14 may occupy is shown in dashed lines. The inclination of the mirror in the second position with respect to the horizontal plane of the system is seen to be smaller than that of the first position.

In its first position, the primary deflecting mirror 14 reflects the light coming from the illuminated line portion 12 onto a first objective element 16. The objective element 16 is mirrored on one side and reflects and focuses the light coming from the mirror 14 onto a copying drum 18 of the copying apparatus. The focal length of the first objective 16 as well as the light paths from the illuminated line region 12 via the principal deviating mirror 14 to the objective 16 and from the objective 16 to the surface of the drum 18 are so chosen that the image 20 on the copying drum 18 of the line region 12 is for example in the ratio 1:1.

A slotted mask 22 limits the ray bundle impinging on the copying drum 18. The drum 18 rotates with a circumferential speed which coincides with the speed of traversal of the document holder 10 over the lamp.

When the principal deviating mirror 14 is pivoted into its second position, shown dashed in FIG. 1, it no longer reflects the light from the illuminated region 12 onto the first objective element 16 but rather reflects it onto the first supplementary deviating mirror 24. The mirror 24 is shown above the dash-dotted beam of light which travels from the principal mirror 14 to the first objective element in the first position of the mirror 14. Thus the upper additional mirror 24 does not interfere with the image formation by the first objective 16 when the principal mirror 14 is located in its first position.

Figure 2:
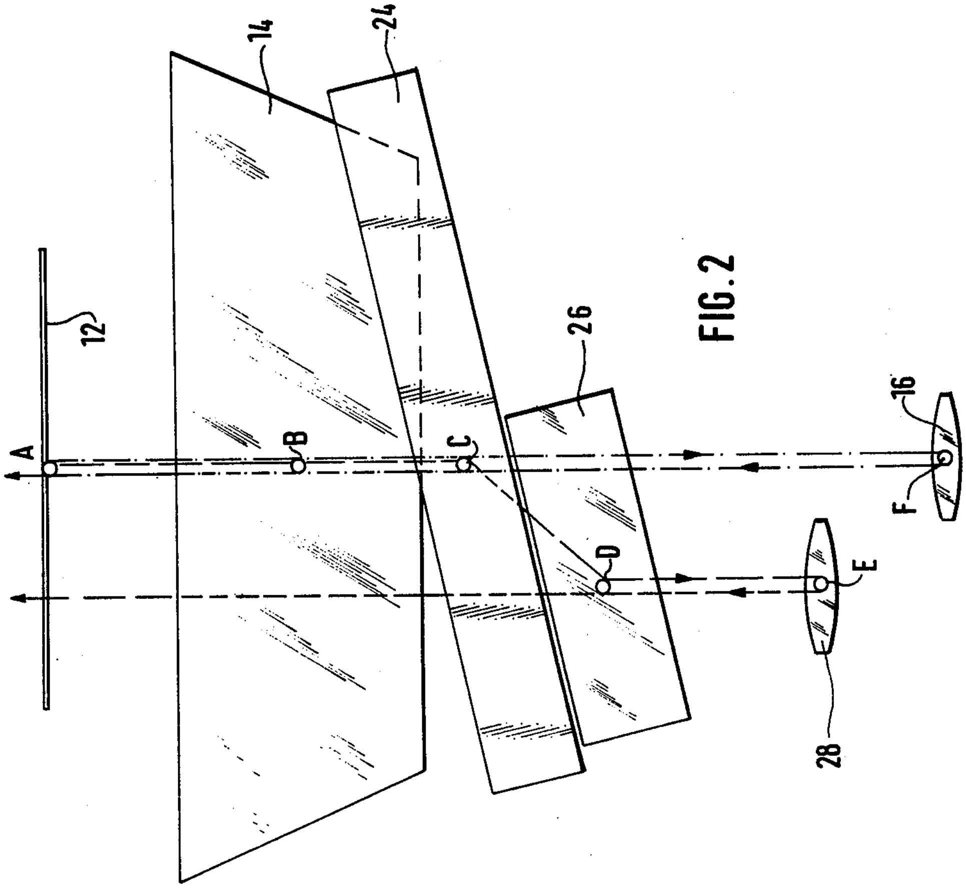
FIG. 2 is a top view of the system depicted in FIG. 1.

As may be best seen in FIG. 2, the longitudinal axis of the first and upper additional deviating mirror 24 is at an oblique angle with respect to the axis of the beam from the principal mirror 14 to the first objective 16. Furthermore as may be seen by reference to FIG. 1, the plane of the first additional mirror 24 is inclined with respect to the horizontal plane of the system, for example the plane of the document holder 10. Due to the inclination of the mirror 24, it reflects the light coming from the principal mirror 14 onto a second supplementary mirror 26. The obliquity of the axis of the upper additional mirror 24 causes the light to be reflected laterally as well as downwardly as may be best seen from the illustration of FIG. 2.

The plane of the lower additional mirror 26 is disposed in exact parallelism with the plane of the upper additional mirror 24. The lower additional mirror 26 reflects the light coming from the mirror 24 onto a second objective element 28. Inasmuch as the second and lower additional mirror 26 is closer to the second objective element 28 than the upper first additional mirror 24, the length of the mirror 26 may be less than that of the upper mirror 24 as is shown to be the case in FIG. 2.

Figure 3:
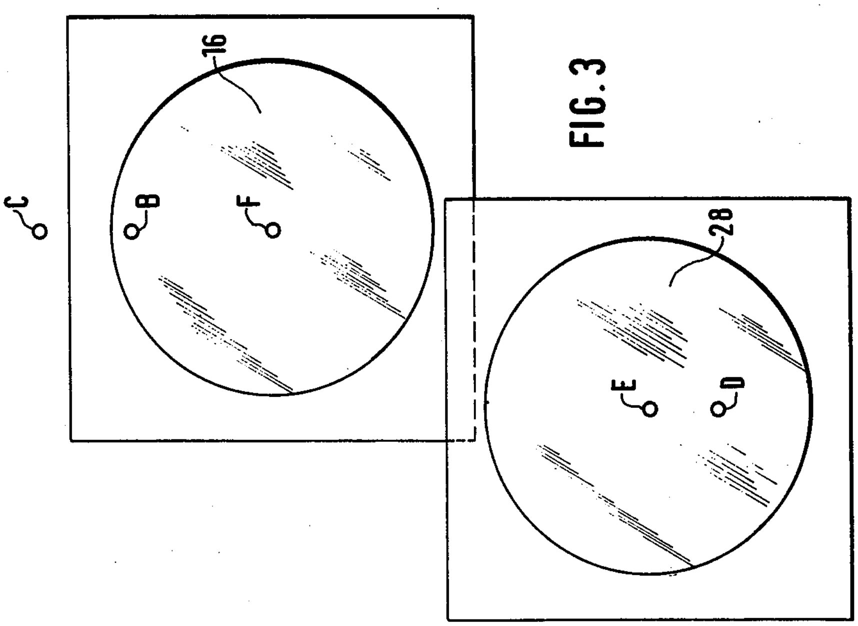
FIG. 3 is a front view of the two objective elements of the optical system according to the invention.

The second objective element 28 is identical in construction with the first objective element 16 but its position is seen to be both laterally and downwardly displaced with respect to the first objective element 16, as best seen in FIG. 3. Furthermore the position of the second objective 28 with respect to the first objective 16 is also displaced toward the copying drum 18 in the direction of the optical axis as may be seen from FIGS. 1 and 2. The light reflected by the second, lower deviating mirror 26 onto the second objective element 28 is returned by the latter and focused as an image onto the copying drum 18 thereby causing the image of the illuminated line region 12 to be placed on the copying drum 18 in sharp focus.

In the exemplary embodiment illustrated, the ratio of the light path from point A of the illuminated line region 12 via the point B of the principal deviating mirror in its second pivotal position, to the point C of the first supplementary deviating mirror 24, to the point D on the second supplementary mirror 26 up to the point E of the second objective element with respect to the length of the light path from point E of the second objective 28 to the surface of the drum 18 is so chosen that the image 20 formed by the second objective 28 is reduced in size with respect to the original, and in this case the ratio is chosen to be 2:1.

The lateral displacement of the images which is caused by the obliquity of the additional upper mirror 24 is so chosen that the left edge of the reduced image formed by the second objective element 28 in FIG. 2 coincides with the left edge of the image formed in the ratio 1:1 by the first objective element 16. Due to this provision, the paper guide mechanism provided on the drum 18 may be used for guiding the copying paper in both modes of operation and for both reproduction ratios.

The disposition of the supplementary deviating mirrors 24 and 26 in parallel planes causes the distortion of the image by the mirror 24 to be exactly counteracted by the lower mirror 26 so that the final image formed by the objective element 28 is undistorted. As may be seen from FIG. 2, the axis of the beam focused onto the drum 18 by the second objective is precisely parallel in the horizontal plane with the axis of the beam focused by the first objective 16. In the vertical plane, as seen in FIG. 1, the optical axes of the beams focused respectively by the first objective 16 and the second objective 28 include a small angle which appears to be greatly enlarged in the illustration of FIG. 1 which is not to scale in the linear dimensions. Due to the curvature of the surface of the drum 18 and the reduction of the image by the second objective element 28, this small angle may be completely ignored and does not cause any lack of focus of the image 28 on the surface of the drum 18.

The path of the rays taken through the optical system may be seen from FIGS. 1 and 2. In FIG. 1, the beams formed by the first objective element 16 and the second objective element 28 are shown in dash-dotted lines. It will be recognized from this illustration that the first supplementary deviating mirror 28 lies entirely above the beam from the principal mirror 14 to the first objective element 16 while the second supplementary mirror 26 lies entirely below the beam from the second objective 28 to the copying drum 18. The placement of these mirrors 24 and 26 in a manner described above insures that the image formation by the objective element 16 or 28 is in no way interfered with. The central axes of the beams are shown in FIG. 1 in dash-double dotted lines.

FIG. 2 illustrates the lateral displacement of the optical axis by the second objective 28. FIG. 2 only illustrates the central beam axes. In FIG. 2, the position of the beam axis in the first setting of the principal mirror 14, i.e. when copying is being done in the ratio 1:1, is shown dash-dotted. The beam axis in the secondary position of the principal mirror 14, i.e. when copying is being done in the reduced ratio of 2:1, is shown dashed.

It is to be understood that the two objective elements 16 and 28 may be embodied as transparent lenses instead of reflecting lenses as shown in the embodiment. In that case it may be suitable, for example, to dispose a mirror at some distance behind the transparent lenses. The overall function of the optical system would be completely identical to that illustrated and described above.

Although omitted from the drawing for the sake of simplicity, the two objective elements 16 and 28 as well as the supplementary mirrors 24 and 26 are held in fixed mutual relation in a common holding frame which also includes means for the pivotal placement of the principal mirror 14. The frame of the optical system would also include an actuating mechanism for pivoting the principal mirror 14 in the manner described above. The pivoting mechanism may be, for example, an electromagnet which is actuated by a switch located on the housing of the copier and which pivots the mirror 14 by suitable and known linkages.

By placing the entire optical system in a common frame it is possible to perform the complete optical adjustment prior to installation in the machine. When the frame is then placed in the copier, only a single adjustment of the frame with respect to the copier is required. Furthermore, the disposition of the entire optical system in a single frame permits a simple choice of supplying the copier with a known optical system or with the novel and selectable optical system according to the present invention. The copier may be retrofitted with the system according to the invention by simple exchange of the optical system frames.

The foregoing relates to a preferred exemplary embodiment of the invention, it being understood that other embodiments and variants thereof are possible within the spirit and scope of the invention.

What is claimed is:

1. An optical system for an electrostatic copying machine, said copying machine including means for receiving an original document to be copied; means for providing moving illumination of sequential line portions of said original document; a primary mirror for reflecting light from said illuminated line portions of said original document to a first objective element, said first objective element being disposed to form a focussed first image of said illuminated line portions on a copying drum; and means for rotating said copying drum in synchronism with said moving illumination; and wherein the improvement comprises:

means for selectively pivoting said primary mirror into a first and a second position;

first and second supplemental mirrors, disposed externally to the light path from said primary mirror to said first objective element and located, respectively, on opposite sides of said light path, the planes of said supplemental mirrors being parallel and inclined with respect to a plane normal to said light path and said supplemental mirrors being set at an oblique angle with respect to said light path; and a second objective element, located displaced from the optical axis of said first objective element, for receiving light from said second supplemental mirror and form forming a focussed second image thereof on said copying drum; whereby, when said primary mirror is placed in its said second position, light from said illuminated line portions is reflected by said primary mirror onto said first supplemental mirror, thence onto said second supplemental mirror and thence to said second objective element which forms said second image thereof on said copying drum, the beam of said second objective element being substantially parallel to the beam of said first objective element, the size of said second image being different from the size of said first image and at least one respective edge of said first and second images being in the same relative location on said copying drum.

2. An optical system as defined by claim 1, wherein said first and second objective elements are identical lenses and wherein said second objective element is displaced along its optical axis from said first objective element.

3. An optical system as defined by claim 2, further comprising frame means for holding said first and second objective elements, said primary mirror and said first and second supplemental mirrors, said frame means being removably mounted in said copying machine.

4. An optical system as defined by claim 3, wherein said means for selectively pivoting said primary mirror is an electromagnet which is mounted in said frame.

5. An optical system as defined by claim 1, further comprising frame means for holding said first and second objective elements, said primary mirror and said first and second supplemental mirrors, said frame means being removably mounted in said copying machine.

6. An optical system as defined by claim 5, wherein said means for selectively pivoting said primary mirror is an electromagnet which is mounted in said frame.

7. An optical system as defined by claim 1, wherein each of said first and second objective elements has one reflective surface and wherein said second supplemental mirror lies external to the beam from said second objective element.

8. An optical system as defined by claim 1, wherein said first and second objective elements are transparent elements and further comprising a mirror disposed behind each of said first and second objective elements and wherein said second supplemental mirror lies external to the beam from said second objective element and from the mirror disposed therebehind.

9. An optical system as defined by claim 8, wherein said first and second objective elements are identical lenses and wherein said second objective element is displaced along its optical axis from said first objective element.

10. An optical system as defined by claim 9, further comprising frame means for holding said first and second objective elements, said primary mirror and said first and second supplemental mirrors, said frame means being removably mounted in said copying machine.

11. An optical system as defined by claim 10, wherein said means for selectively pivoting said primary mirror is an electromagnet which is mounted in said frame.

* * * * *